Patented Jan. 20, 1942

2,270,352

UNITED STATES PATENT OFFICE 2,270,352

FLUID CONTAINING SILICYL DERIVATIVES

Frank J. Sowa, South Bend, Ind., assignor to International Engineering Corporation, Chicago, Ill., a corporation of Illinois No Drawing. Application April 26, 1937, Serial No. 139,007

5 Claims. (Cl. 252—79)

This invention relates to silicyl derivatives of organic compounds and methods of preparing the same and more particularly to the preparation of compounds of this type which are useful as fluids for hydraulic brakes.

One feature of my invention is the preparation of a chemically stable fluid which has a low vapor pressure and good lubricating qualities and yet a relatively low viscosity. Another feature of my invention is the preparation of a fluid which has but slight, if any, physical or chemical effect upon steel, aluminum, copper, cadmium, rubber, or other materials forming a part of an hydraulic brake system. Still another feature of my invention is the preparation of a fluid which will reduce to a minimum the wear of moving parts in contact with each other while immersed in the fluid.

Certain esters of ricinoleic acid have heretofore been prepared by reacting the acid with alcohols. Oils and mixtures of oils containing these synthetic esters as well as similar natural esters, for instance, glyceryl tri-ricinoleate found in castor oil, have been known and used as fluids for hydraulic brakes. These substances, however, do not satisfactorily prevent wear of moving parts and provide only fair lubrication.

I have discovered that by the substitution of a silicyl group in a ricinoleate group a chemically stable fluid with improved qualities of lubrication and with a low vapor pressure and yet a relatively low viscosity is obtained.

Obviously, such fluids are valuable for many purposes other than use in hydraulic brakes. They may also be used as lubricants, plasticizers, detergents, emulsifying agents and for many other purposes. For the purpose of explaining my invention, however, the description will be given with reference to their use as brake fluids.

In the preparation of the silicyl derivatives of organic ricinoleates, the essential reactants consist of two groups, first the ricinoleate group, and second the silicyl group.

By an organic ricinoleate is meant a compound resulting from the reaction of an alcohol with ricinoleic acid with the elimination of water. The ricinoleate groups may be present in the form of ricinoleic acid or esters of ricinoleic acid.

The esters of ricinoleic acid are generally preferred because in this case the final product may be obtained directly. Otherwise, esterification of the reaction product must be carried out before the final product is obtained.

The silicyl group, on the other hand, contains a silicon-oxygen linkage and is found in any organic silicate. Ethyl orthosilicate $Si(OC_2H_5)_4$, because of its relatively low cost at the present time, is generally to be preferred for the reaction.

The reaction is carried out by mixing the two components according to the ratio of one mol of silicate to three mols of ricinoleate. For some reason, possibly stearic hindrance, the fourth oxy group of the silicate is not removed. Of course, a smaller amount of silicate may be used, but the reaction product will contain less than three ricinoleate groups on each silicon atom, and the more complete the substitution, the better will be the lubricating qualities of the product and the less will be the swelling of rubber which it will cause.

When an ester of ricinoleic acid containing more than one ricinoleate group is used, the ester should ordinarily be treated as though it contained only one ricinoleate group for the purpose of determining the quantity to be used. This is done because in most di- and tri-ricinoleates, possibly again because of stearic hindrance, only one ricinoleate group in each molecule reacts.

These directions are intended only as aids in securing a complete reaction. The ratio to be used varies with different compounds. I have found that the use of a slight excess of silicate is the best means to secure complete reaction. Silicate may be added until it no longer reacts. The product may then be distilled to determine the excess and the proper ratio determined therefrom.

The time and temperature relations may vary considerably, depending upon the results desired and the time that may be allowed for the reaction to be completed. Heating, although not essential, will cause the reaction to be more rapid. In general, such time and temperature should be selected as will cause the reaction to be completed in a reasonable length of time, but without using such high temperature as to destroy the components.

It is not necessary that the components of the reaction be pure. Crude mixtures containing the desired substances may be used. For example, castor oil contains a high percentage of glyceryl tri-ricinoleate. If this mixture is treated with a suitable organic silicate, the resulting product is an oil possessing excellent qualities as a lubricant for a brake fluid. Other natural oils containing esters of ricinoleic acid may be used with similarly satisfactory results.

The silicyl derivatives of esters of ricinoleic acid are preferably combined with a diluent for use as a fluid in hydraulic brakes. In this manner, a lower viscosity is obtained without seriously affecting the other desirable properties of the fluid. Any fluid which is miscible with the ricinoleates, which does not react with metals, which has a low viscosity, which does not have a high vapor pressure at ordinary atmospheric temperatures, and which does not cause an appreciable swelling of rubber, may be used. Many organic solvents will meet these requirements. However, alcohols, and especially the higher alcohols, have been found to be satisfactory. Diacetone alcohol, fusel oil (a mixture of amyl alcohols), and glycol ethers are among those used. Of the glycol ethers the mono ethyl ether of ethylene glycol, sold commercially under the trade name "Cellosolve," and the monobutyl ether of ethylene glycol, sold commercially under the trade name "Butyl Cellosolve" are to be preferred because of their relatively low cost.

It is believed that the reactions are of the type exemplified by the following equation:

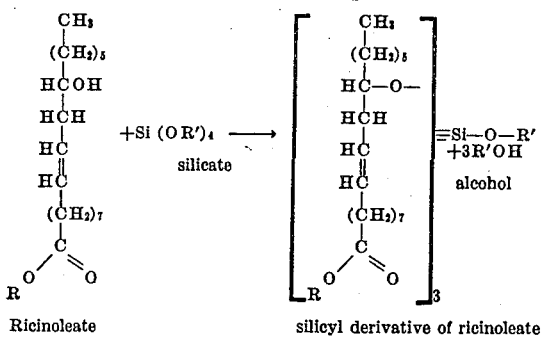

Ricinoleate          silicyl derivative of ricinoleate in which R and R' are any organic radicals. The number of groups which will be substituted varies with the particular compounds used with the quantities of the components of the reaction which are used and also with the conditions of the reaction. If ricinoleic acid is used instead of the ester of ricinoleic acid, the $Si(OR)_4$ will serve to esterify the acid as well as to substitute silicyl groups.

It is understood that the formulae and equations are used only to aid in a better understanding of the reaction involved, and I do not wish to be bound by them.

Although the reactions of organic silicates with ricinoleic acid and ricinoleates have been discussed in detail, it is not intended that the scope of this invention be limited to these reactions. Organic silicates will also react with many organic compounds to form silicyl derivatives thereof. The reaction occurs very readily in the case of acids and esters of acids which contain an hydroxyl group in the hydrocarbon chain.

For the purpose of making the invention clear, the following specific examples of processes utilizing the invention may be set out in detail:

(1) Reaction between castor oil and ethyl ortho silicate.

467 grams (½ mol) of castor oil and 36.7 grams (a slight excess over ⅙ mol) of ethyl orthosilicate are weighed into a flask fitted with a reflux condenser and sealed from the air with a simple mercury trap. The mixture is then refluxed at a temperature of 350°–360° F. for about two hours, at which time the reaction is complete and the temperature drops to about 275 to 290° F. The ethyl alcohol formed in the reaction (about 25 cc.) may then be distilled off under reduced pressure. Or, if desired, it may be allowed to remain as a diluent if the lubricant is to be used as a brake fluid.

At any rate, if an hydraulic brake fluid is to be prepared the above product may be diluted in various proportions with various diluents. For instance, a mixture of 45% of the above product with 55% of "Butyl Cellosolve" has been found to produce an excellent brake fluid. Such a fluid does not cease to flow until a temperature of −66° F. has been reached. At 90° F. it has a viscosity of 120 Saybolt seconds, and at −10° F., a viscosity of 2120 Saybolt seconds. Not more than two percent of this fluid distills below 340° F. By using a larger proportion of diluent a lower viscosity may be obtained, while a lower proportion of diluent will increase the viscosity.

(2) Reaction between the methyl ester of ricinoleic acid and ethyl orthosilicate.

936 grams (3 mols) of the methyl ester of ricinoleic acid are added to 215 grams (slightly in excess of 1 mol) of ethyl orthosilicate. The mixture is then refluxed in the manner described in Example 1 for about three hours at the end of which time the reaction is practically complete and the alcohol is distilled off.

The silicyl derivative of the methyl ester of ricinoleic acid thus formed is then mixed with fusel oil, according to the ratio of 60 parts by volume of the silicyl derivative to 40 parts by volume of the fusel oil, to produce an hydraulic brake fluid.

The foregoing specific examples have been given merely for the purpose of illustrating the invention and the means of practicing it, and it will be understood that substitutions may be made and equivalent modifications employed by those skilled in the art, without departing from the spirit and scope of my invention. No unnecessary limitations should, therefore, be understood therefrom, but the appended claims should be construed as broadly as permissible, in view of the prior art.

I claim:

1. A fluid for use in hydraulic pressure apparatus comprising the combination of a silicyl derivative of an ester of ricinoleic acid and an ether of a polyhydric alcohol.

2. A fluid for use in hydraulic pressure apparatus comprising the combination of a silicyl derivative of an ester of ricinoleic acid and ethyl ether of ethylene glycol.

3. A fluid for use in hydraulic pressure apparatus comprising the combination of a silicyl derivative of a ricinoleic acid ester of a polyhydric alcohol and ethyl ether of ethylene glycol.

4. A fluid for use in hydraulic pressure apparatus comprising the combination of a silicyl derivative of a ricinoleic acid ester of a polyhydric alcohol wherein the silicyl group is linked directly to the ricinoleic acid group and an ether of a polyhydric alcohol.

5. A fluid for use in hydraulic pressure apparatus comprising the combination of a silicyl derivative of a ricinoleic acid ester of a polyhydric alcohol wherein the silicyl group is linked directly to the ricinoleic acid group and butyl ether of ethylene glycol.

FRANK J. SOWA.